US006147345A

United States Patent [19]

Willoughby

[11] Patent Number: 6,147,345
[45] Date of Patent: Nov. 14, 2000

[54] METHOD AND APPARATUS FOR INCREASED ELECTROSPRAY ION PRODUCTION

[75] Inventor: Ross C. Willoughby, Pittsburgh, Pa.

[73] Assignee: Chem-Space Associates, Pittsburgh, Pa.

[21] Appl. No.: 08/946,290

[22] Filed: Oct. 7, 1997

[51] Int. Cl.[7] .............................. H01J 47/00; B01D 59/44

[52] U.S. Cl. ........................ 250/288; 250/281; 250/423 R

[58] Field of Search ..................................... 250/288, 281, 250/423 R

[56] References Cited

U.S. PATENT DOCUMENTS

| | | | |
|---|---|---|---|
| 5,753,910 | 5/1998 | Gourley et al. | 250/288 |
| 5,828,062 | 10/1998 | Jarrell et al. | 250/288 |
| 5,873,523 | 2/1999 | Gomez et al. | 239/3 |
| 5,945,678 | 8/1999 | Yanagisawa | 250/423 F |

*Primary Examiner*—Bruce C. Anderson
*Assistant Examiner*—Nikita Wells

[57] ABSTRACT

An improved electrospray ion production method and ion source designed to increase the current generated from the electrospray process. A method and device are disclosed that utilize controlled counter-ion impingement onto an electrospray cone-jet in order to increase the total current of the spray and impart additional energy into the surface of the cone-jet. Gas-phase counter-ions are generated external to the needle and attracted by the high field gradients into the surface of the electrospray cone-jet. The counterions impinging into the surface of the electrospray cone-jet will dissolve and participate directly or indirectly in an increased electron transfer rate at the needle electrode. This process results in increased total analyte ion transfer to the cone-jet surface, increased charge on droplets, and increased transport of analyte from the liquid into the gas phase. The method is useful for increasing the detection sensitivity of analytes in solution that are electrosprayed and analyzed with mass spectrometry.

18 Claims, 6 Drawing Sheets

METHOD AND APPARATUS FOR INCREASED ELECTROSPRAY ION PRODUCTION

U.S. Pat. Documents:

| | | |
|---|---|---|
| 4,542,293 | 9/1985 | Fenn et al. |
| 4,842,701 | 6/1989 | Smith et al. |
| 4,885,076 | 12/1989 | Smith et al. |
| 4,977,320 | 12/1990 | Chowdhury et al. |
| 5,015,845 | 5/1991 | Allen et al. |
| 5,115,131 | 5/1992 | Jorgenson et al. |
| 5,376,789 | 12/1994 | Stenhagen |
| 08/701050 | 8/1996 | Sheehan |

International Patent Documents:

| | | |
|---|---|---|
| WO 93/07465 (PCT/US92/08321) | 5/1993 | Kaufman et al. |
| WO 93/24209 (PCT/US93/04903) | 12/1993 | Mordehai et al. |

Other Publications

Grace, J. M. and Marijnissen, J. C. M. J. Aerosol Sci. (1994) Vol. 25, No. 6, pp. 1005–1019, *A Review of Liguid Atomization by Electrical Means.*

Kebarle, P and Tang, L. Anal. Chem. (1993), Vol. 65, No. 22. *From Ions in Solution to Ions in the Gas Phase.*

Tang, K. and Gomez, A. J. Aerosol Sci. (1994) Vol. 25, No. 6, pp. 1237–1249. *Generation by electrospray of monodisperse water droplets for targeted drug delivery by inhalation.*

Tang, K. and Gomez, A. J. Colloid and Interface Sci. (1995) 175, 326–332, *Generation of Monodisperse Water Droplets from Electrosprays in a Corona-Assisted Cone-Jet Mode.*

Tang, K. and R. Smith, International Journal of Mass Spectrometry and Ion Processes. 162(1997) 69–76, *Sensitivity enhancement of electrospray ionization-MS for aqueous solutions in the corona-assisted cone-jet mode.*

TECHNICAL FIELD

This invention relates to a method and apparatus for electrospraying solutions of chemical species for detection in gas phase ion detectors, particularly chemical species that are separated and detected with liquid chromatography-mass spectrometry.

BACKGROUND ART

Electrospray processes have become an important means of producing highly charged droplets and gas phase ions.(1) A particularly useful application of the electrospray process is the production of gas phase ions from analytes in liquid solutions delivered by high pressure liquid chromatography, capillary electrochromatography or capillary electrophoresis to a mass spectrometry for detection and analysis. Electrospray processes have been observed for solutions with positive and negative needle potentials which result in positive and negative net charge on droplets, respectively. The charged droplets from the electrospray process evaporate and ultimately eject ions into the gas phase from the solution.(2)

The electrospray process, in its simplest geometric form, is represented by the "classic cone-jet" represented in FIGS. 1 and 2. We define a classic cone-jet as one in which no appreciable discharge or gas breakdown occurs in the gases surrounding the electrospray cone-jet. FIG. 1 shows the electrospray process presented as an integral part of an electrical circuit. In the bulk solution, current flows via migration of anions and cations. On the surface of the cone-jet and droplets, current flows via motion of the liquid carrying a net charge. In the other regions of the circuit, electrons move through conductors. Electron transfer reactions occur at the interfaces between the solution and the conductors to maintain charge balance in the circuit [denoted in FIG. 1 as needle electrode and collection electrode]. In the ionization region some of the charge is carried by motion of gas-phase ions produced by electrospray ionization. When operating electrospray with a positive needle potential, an oxidation reaction occurs at the needle electrode and a reduction reaction occurs at the collection electrode. When operating electrospray with a negative needle potential, a reduction reaction occurs at the needle electrode and oxidation occurs at the collection electrode. It should be noted that in the case of conductive needles, the needle itself serves as the needle electrode. In FIGS. 1 and 2 the solution electrode is shown to be discrete from the needle in order to better illustrate the location of the redox reactions and the motion of the ions in solution relative to the electrode. These Figures would be representative of operation with insulated needles.

FIG. 2 shows a schematic diagram of an expanded view of an electrospray cone-jet operating in the positive mode. The arrows indicate the general direction of electrophoretic migration of anions [A−] and cations [C+] in a solution. In this particular case the anions are migrating in the direction of the needle electrode [anodes]. The shaded area of the cone-jet represents the gas-liquid interface where a net positive charge resides due to the depletion of anions or enrichment of cations at the surface of the liquid. The liquid is accelerated in the cone region by a high electrical field at the surface until liquid motion overcomes surface tension. At this point a liquid jet emerges from the apex of the cone with a net positive charge from excess cations on the surface.

FIG. 3 shows a current-voltage plot for electrospray of methanol indicating the boundaries of stable cone-jet operation. Most solvents sprayed with electrospray exhibit a qualitatively similar behavior to methanol where the stable cone-jet is bracketed by a lower voltage limit represented by an onset voltage [$V_{onset}$] and an upper voltage limit [$V_{breakdown}$] represented by a discharge voltage. The specific values for $V_{onset}$ are a function of the solution, flow, and system geometry. While the specific values for $V_{breakdown}$ are a function of pressure, surrounding gas composition, and system geometry.

The amount of current collected at the collection electrode in this classic mode of electrospray is highly dependent upon the nature of the solution being sprayed. The deformation of the liquid resulting in the cone-jet geometry is a balance between the forces holding the liquid onto the end of the needle [intermolecular forces of the solution] and the forces driving the ions on the surface of the liquid toward the collection electrode [motion of ions in field gradients]. The net charge in electrospray is due to the migration of ions [cations and anions] through the solution relative to the rate of removal of liquid from the tip of the needle. Both processes are governed by the properties of the liquid.

Some recent experiments by Tang and Gomez (3,4) show that a stable cone-jet is also observed in the presence of a corona discharge. This new regime of stable operation of electrospray cone-jets occurs at lower voltages and higher observed current than classic cone-jet mode and was denoted the corona-assisted mode of electrospray. These experiments suggest that an external source of ions, as they observed from their experimental system under conditions of spontaneous corona discharge, may lead to sensitivity enhancements in electrospray. They attributed their results to increased charging of droplets by $(CO_2)H^+$, $(CO_2)_2^+$, and $(CO_2)_2H^+$, observed with mass spectrometry. They suggest that the higher current they observed was a consequence of the collection of these gas-phase ions onto the liquid and droplet surfaces.

The present invention is also a method and an apparatus for generating external gas-phase ions for interacting with electrospray processes in order to enhance charging of the droplets.

References

1. Grace, J. M. and Marijnissen, J. C. M. J. Aerosol Sci. (1994) Vol. 25, No. 6, pp. 1005–1019, *A Review of Liguid Atomization by Electrical Means.*
2. Kebarle, P and Tang, L. Anal. Chem. (1993), Vol. 65, No. 22. *From Ions in Solution to Ions in the Gas Phase.*
3. Tang, K. and Gomez, A. J. Aerosol Sci. (1994) Vol. 25, No. 6, pp. 1237–1249. *Generation by electrospray of monodisperse water droplets for targeted drug delivery by inhalation.*
4. Tang, K. and Gomez, A. J. Colloid and Interface Sci. (1995) 175, 326–332, *Generation of Monodisperse Water Droplets from Electrosprays in a Corona-Assisted Cone-Jet Mode.*
5. Tang, K. and R. Smith, International Journal of Mass Spectrometry and Ion Processes. 162(1997) 69–76, *Sensitivity enhancement of electrospray ionization-MS for aqueous solutions in the corona-assisted cone-jet mode.*

SUMMARY OF INVENTION

The present invention is a method and apparatus for generation of increased net charge on electrosprayed droplets from a solution containing analyte ions. The method comprises a step of generating a population of gas-phase counterions opposite in charge to the electrospray needle polarity in a region adjacent to the tip of an electrospray needle. The method comprises a step of directing the counterions at the tip of the needle in a manner so that a significant quantity of the counterion population impinges with the exposed cone-jet liquid surface of an operating electrospray needle. We define an operating electrospray needle as a needle spraying highly charged droplets by virtue of being held at high electrical potential and emitting a cone-jet geometry. The present invention does not require that the cone-jet be absolutely stable in time and geometry; however stable operation is preferred. The liquid jet emerging from the cone-jet breaks into droplets downstream from the cone-jet. This method requires that the counterions be soluble in the sprayed solution. This method also requires that the counterions contribute directly or indirectly to an increased rate of the needle electrode electron transfer reaction. This method applies to both positive and negative modes of electrospray.

An apparatus for the present invention comprises a gas-phase counterion source, such as a discharge source or ion gun. The counterions may be generated by, but are not limited to, electron capture processes, electron impact ionization processes, field ionization processes, thermal ionization processes, and laser ionization processes. The counterions produced from the counterion source may be emitted directly from a primary source such as, cesium ions from a cesium ion gun. The counterions produced from the counterion source may be a reaction product of a gas-phase reaction such as electron capture. Electron or ion emission from filament or discharge sources are regulated and controlled by conventional control means.

The apparatus for the present invention also comprises a steering means for steering, focusing and/or directing counterions generated in the counterion source in a manner that will cause the counterions to accelerate toward the exposed liquid surfaces emerging from the tip of an electrospray needle. The requirement for steering and/or focusing of the counterions will depend upon the relative spatial and geometric position of the counterion source and the electrospray needle. We envisage a wide range of ion optical approaches that are standard for moving ions from one point to another; including but not limited to lenses, deflector plates, and magnets.

The present invention is distinguished from the art of Tang and Gomez in that it relies exclusively on gas phase ions of opposite charge from the needle polarity [denoted here as counter-ions]. The present invention relies exclusively on the steering of eternally generated counterions toward the surface of the cone-jet region of the electrospray. By impinging the counter-ions into the cone-jet surface, the counter-ions have the opportunity to contribute to the increased potential energy of the cone-jet and participate in the increased flow of current through the needle electrode. The present invention also relies on controlled [not spontaneous as with Tang and Gomez] generation of counter-ion populations in the regions surrounding the cone-jet.

With the present invention counterions may be generated independent of the pressure surrounding the cone-jet [e.g. at low pressure]. The electrospray cone-jet production in the present invention may occur at either atmospheric pressure or a reduce pressures. In addition, counter-ions may be generated externally independent of the composition of gas surrounding the needle and cone-jet region as long as the surrounding gas does not interfere with the impingement process of the present invention. Examples of interferences of the impingement process by surrounding gases would be electrical breakdown of the surrounding gas; collisional dissociation of the counter-ion through collisions with the surrounding gas; and reaction with the surrounding gas to for uncharged products. The use of counter-ions with the present invention ensures a higher collection efficiency of the ions on the oppositely charged liquid surface.

DETAILED DESCRIPTION OF THE PREFERRED EMBODIMENTS

The present invention may be used to generate electrosprays with higher total spray current and higher gas-phase ion production efficiency in order to detect a wide variety of ionized analytes in solution. Typical solvents include, but not limited to water, acetonitrile, and methanol. Typical analytes are drugs and metabolites, biopolymers, metals, or any ionic species soluble in said solvents or solvent mixtures. Preferred flow rates for electrospray operation are from 0.05 to 50 microliters per minute.

One embodiment of the apparatus of the present invention is shown schematically in FIG. 4. The electrospray needle 12 is connected to the downstream end of transfer tube 36. The electrospray needle 12 and tube 36 are electrically isolated from liquid supply tube 34 by insulator tube 35. Electrospray high voltage power supply 40 is connected to the electrospray needle 12 at high voltage needle connection 16 through high voltage connecting wire 42. The high voltage connection 16 is made through either direct contact with flowing liquid solution 14 [in the case where needle 12 is an insulator] or contact with needle 12 [in the case where needle 12 in a conductor]. The apparatus is operated by applying a voltage difference between high voltage connection 16 and the collection electrode 24. Liquid solution from liquid supply 32 is pumped through tubes 34, 35 and 36 into needle 12 at high electrical potential. As the liquid exits needle 12 it forms a cone-jet geometry liquid meniscus at the outlet of needle 12.

Gas phase counterions are generated in counterion ionization region or source 54. In this embodiment the counterions are generated by applying high voltage from power supply 44 to discharge needle or electrode 56 to create an electrical discharge in region 54. The counterion generation process is governed by the discharge process and the composition of the reagent gas. The reagent gas is supplied to the counterion ionization region by a regulated and metered discharge gas supply 50 through gas line 52. Gas phase reaction products are extracted from the counterion ionization region by applying the appropriate voltage to extraction lens 58. Selection of the reagent gas and discharge conditions [pressure, voltage] depend upon the type and stability of desired counterions. The charge on the ionization products in a typical discharge may have both signs. The present device is intended to operate under favorable conditions for counterion production where the counterions are extracted and directed toward the oppositely charge surfaces of the electrospray cone-jet 18. The general motion of the counterions is shown by counterion stream or beam 22.

Note that counterion production for some applications may be more efficient with other primary sources. A filament instead of a discharge needle operates at lower voltage and may be preferred for low energy processes. A microwave discharge has some advantages over direct current discharges in ion plasma characteristics and space charge effects. This invention includes the extended art of gas-phase ion production.

At least part of the population of counterions from counterion stream 22 impinge into the surface of electrospray cone-jet 18 and dissolve in the solution. The addition of gas phase ions of opposite polarity to the net charge on the cone will cause an increase in the rate of migration of same polarity ions from within the solution to the surface of the cone-jet 18 causing an increase in net current in the spray.

The breakup of the liquid jet emerging from cone-jet 18 results in a downstream spray comprising charged droplets and ions in the electrospray aerosol spray or ionization chamber 20. The ions and droplets are attracted to the collection electrode 24. Some of the electrospray aerosol generated in chamber 20 is sampled through aperture 26 into a reduced pressure or vacuum chamber 28. The ions transferred into chamber 28 are focused, trapped, energy analyzed, mass analyzed, and manipulated in other means that are generally considered standard processes in mass spectrometry and other gas-phase ion detectors.

The electrospray needle 12 is inserted into electrospray aerosol spray chamber 20 through spray chamber wall 70 in order to isolate the spray process from atmosphere. Chamber 20 provides broader flexibility in use of chamber gases and control of spray conditions. Gas or mixtures of gases are introduced into chamber 20 via chamber gas connection 82 from a regulated and metered chamber gas supply 80. With controlled gas composition and pressure, optimal experimental conditions may be obtained. For example, air undergoes electrical breakdown at lower voltages than oxygen. For circumstances where higher voltages are needed for spraying, such as with high water content, or possibly breaking down air during negative ion operation, addition of oxygen to the chamber may have benefits. In addition, stable cone-jets are also observed at pressures below 0.1 Torr; under this mode of electrospray the electrospray aerosol spray chamber 20 would require evacuation with a high vacuum pump [not shown].

A heating cartridge 30 is inserted into the collector electrode to provide heat to the electrospray aerosol spray chamber to facilitate the electrospray ionization processes.

A second embodiment of the apparatus of the present invention is shown schematically in FIG. 5. This embodiment is similar to that displayed in FIG. 4 with several exceptions. The reagent gas in this apparatus is introduce into the electrospray aerosol generation chamber through a coaxial reagent gas tube 10. The primary discharge is intended to generate a primary flux or beam of ions or electrons 60 directed at the cone-jet. This primary flux 60 collides with the reagent gas introduced radially around the cone-jet before impinging into the cone-jet 18 surfaces. The collision of the primary flux 60 and the reagent gas will produce desired counterions at a location spatially closer to the cone-jet 18 than displayed in FIG. 4. This embodiment is intended to address the production of counterions that may be lost in transit through collision, charge exchange, or other gas phase processes in the embodiment shown in FIG. 4 where counterions are generated remotely to the electrospray cone-jet.

The third embodiment of the apparatus of the present invention is shown schematically in FIG. 6. This embodiment generates the counterions downstream and on axis with the electrospray cone-jet. The discharge electrode 56 in this embodiment is located in a discharge cavity where the counterion ionization source 54 is located. This embodiment utilizes a tubular blade geometry for the discharge electrode. This geometry produced a counterion beam that is produced in a volume around the axis of the cone-jet in a manner that the counterions are applied to the surface in a more uniform and symmetrical fashion.

Preferred Embodiment Numbering

10
coaxial reagent gas tube

12
electrospray needle [conductor or nonconductor]

14
flowing liquid solution

16
high voltage needle connection [entire needle when needle in made of conducting material]

18
electrospray cone-jet

20
electrospray aerosol spray or ionization chamber

22
counterion stream or beam

24
collection electrode

26
aperture 28
reduced pressure or vacuum chamber
30
heating cartridge
32
liquid supply
34
liquid supply tube
35
insulator tube
36
transfer tube
40
electrospray high voltage power supply
42
high voltage connecting wire
44
discharge high voltage power supply
50
regulated and metered discharge gas supply
52
gas line
54
counterion ionization region or source
56
discharge needle or electrode
58
extraction lens [lens power supply not shown]
60
primary flux or beam of ions or electrons
70
spray chamber wall
80
regulated and metered chamber gas supply

BRIEF DESCRIPTION OF THE DRAWINGS

FIG. One- A schematic diagram of the operation of a classic electrospray cone-jet in the positive ion mode showing the needle region, the cone region, and the jet region; drawn as an electrical circuit to show the direction of current flow and the direction of liquid and charged droplet motion.

FIG. Two- A expanded schematic diagram of a classic electrospray cone-jet showing the general direction of migration of anions and cations in solution for the positive ion mode of electrospray. The anions in this mode will migrate in the direction of the positive electrode (liquid/metal junction) where the high potential is applied to the solution.

Figure 1:
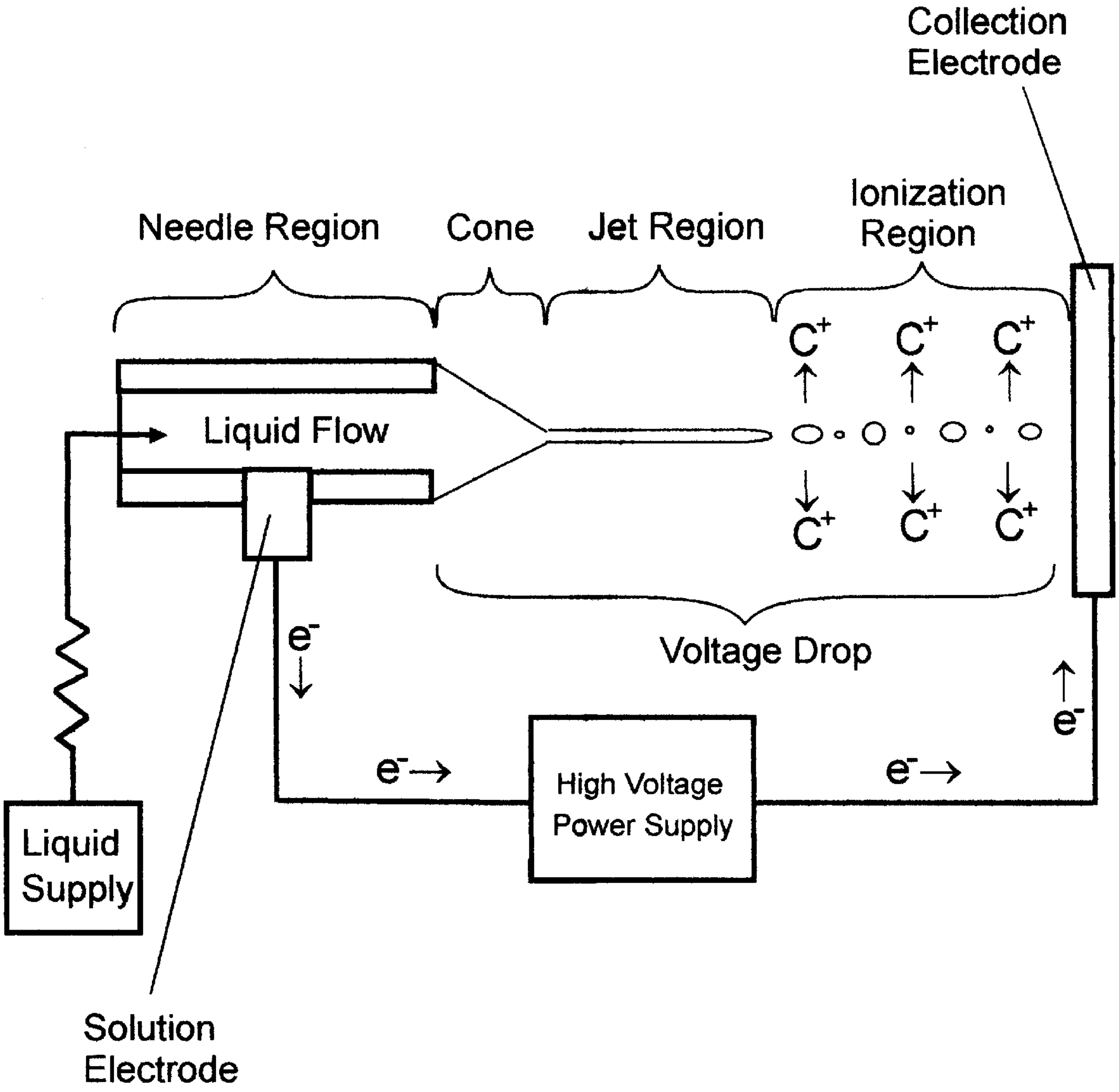
Figure 2:
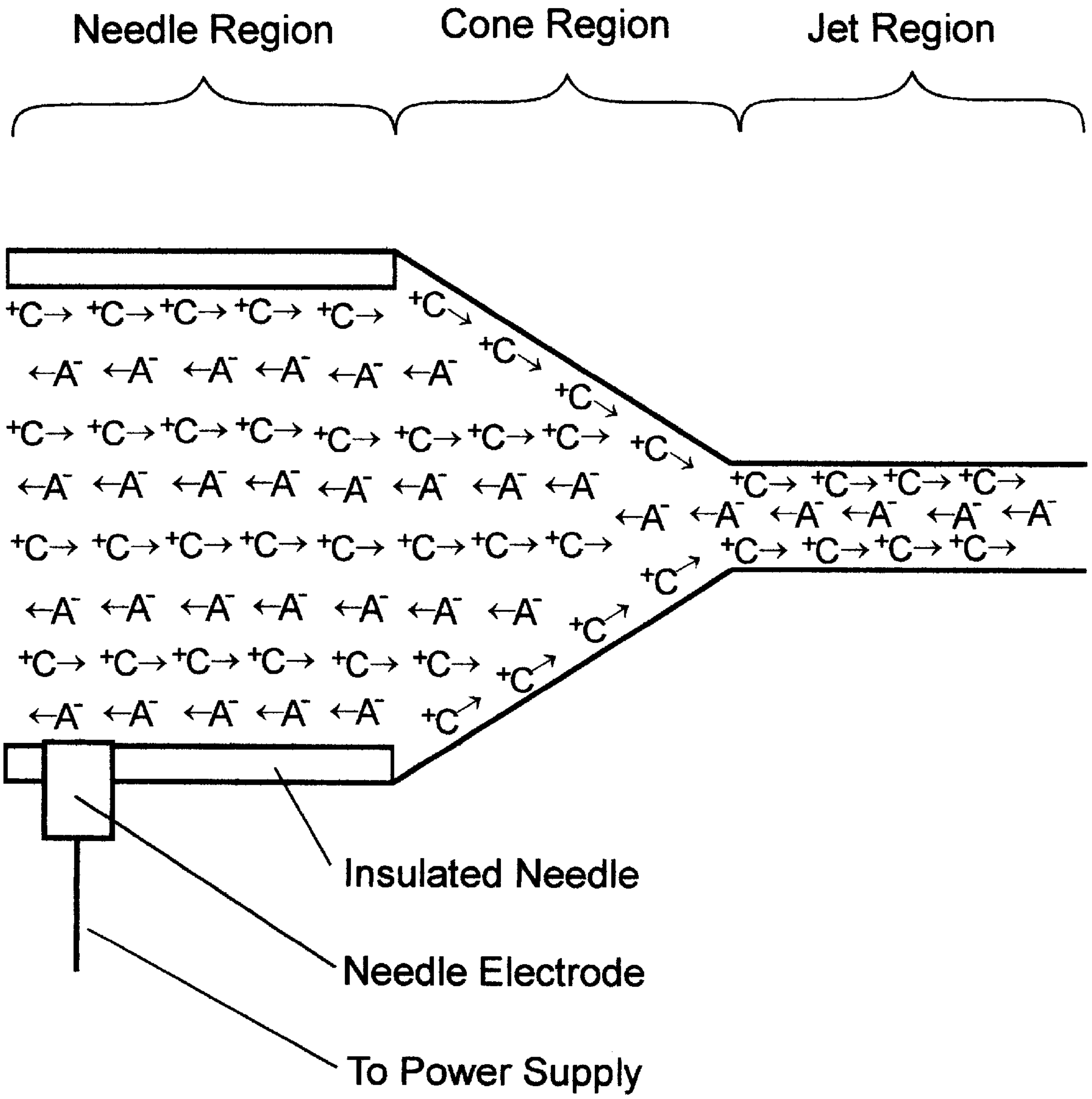
Figure 3:
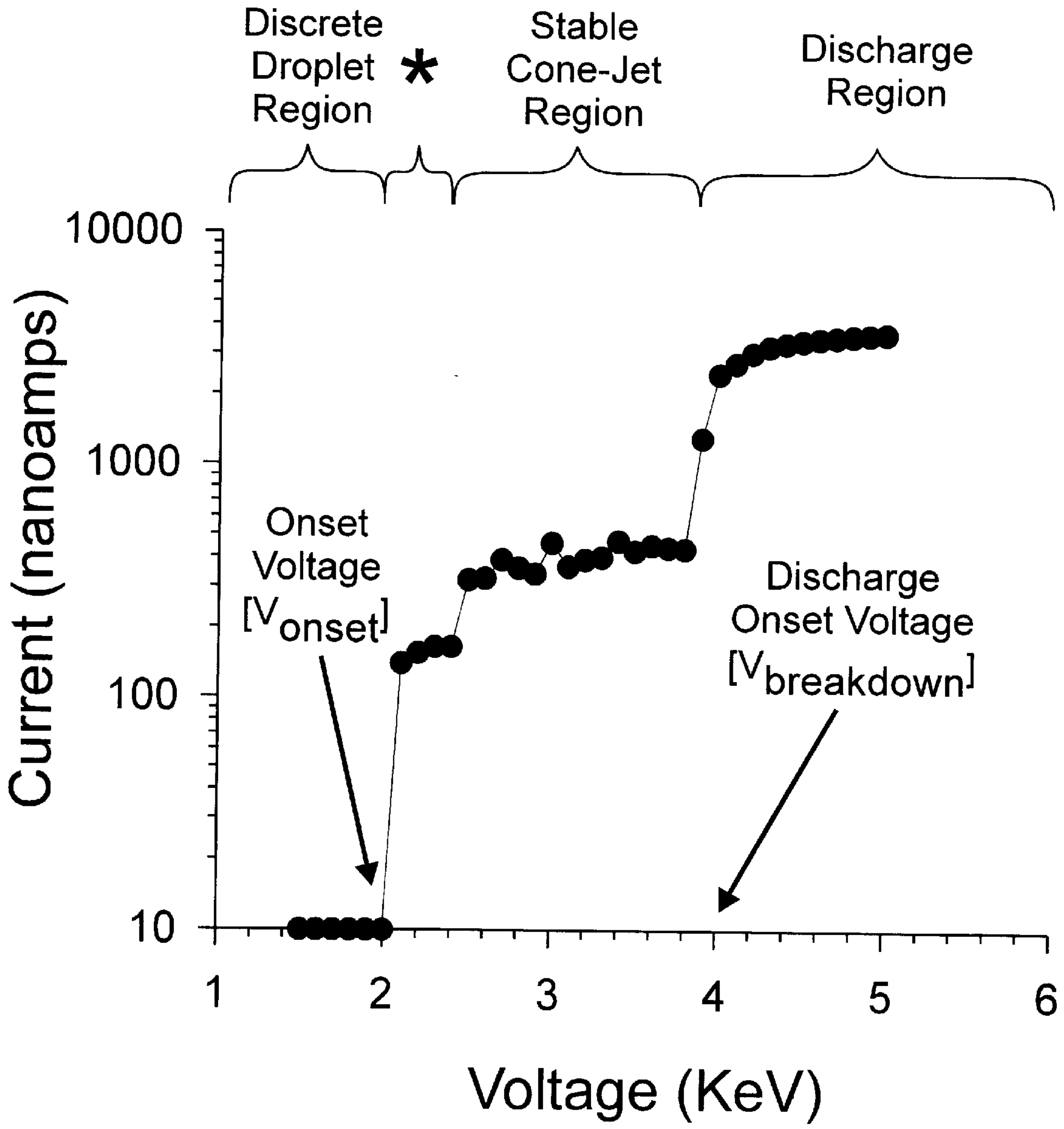
Figure 4:
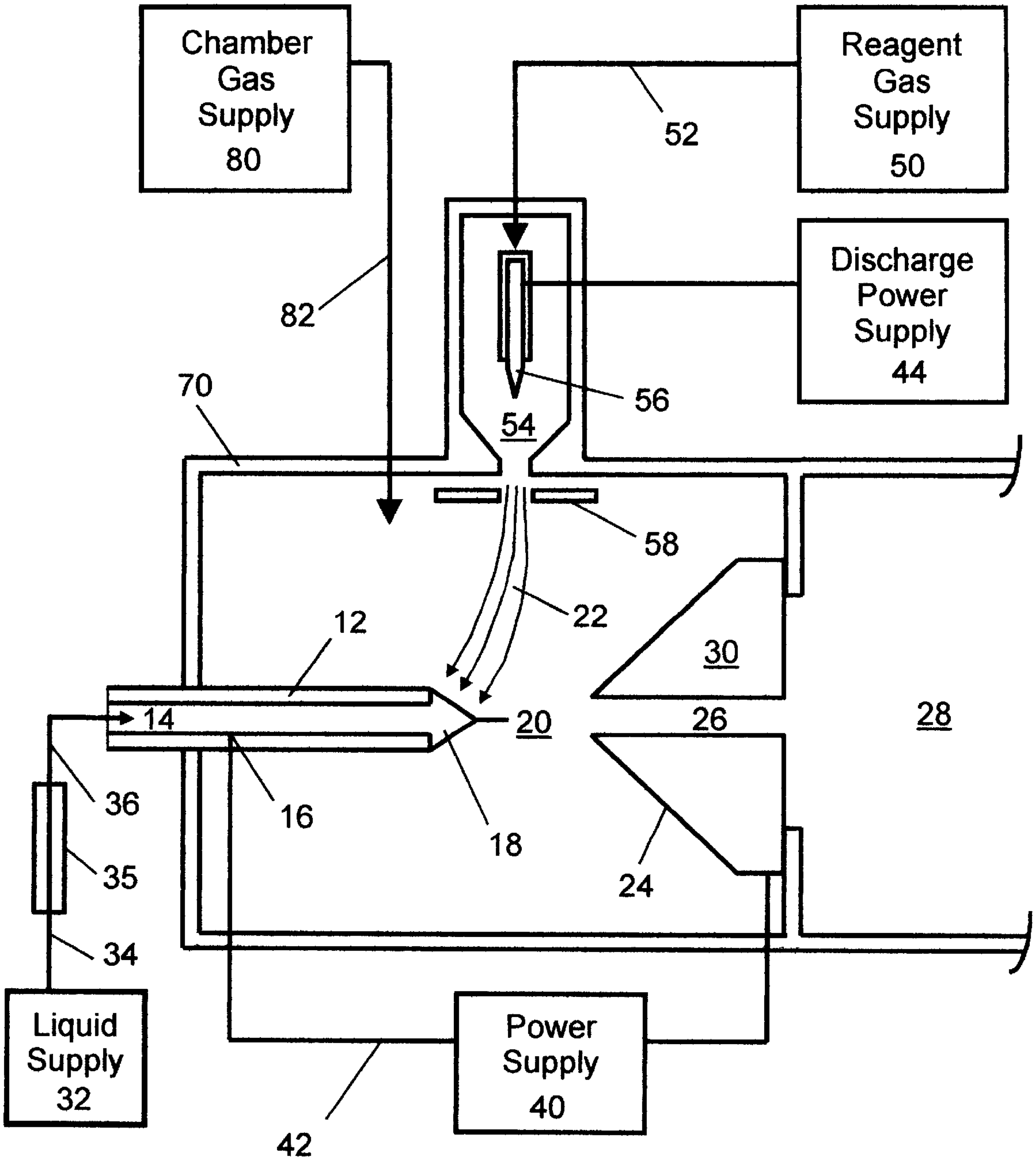
Figure 5:
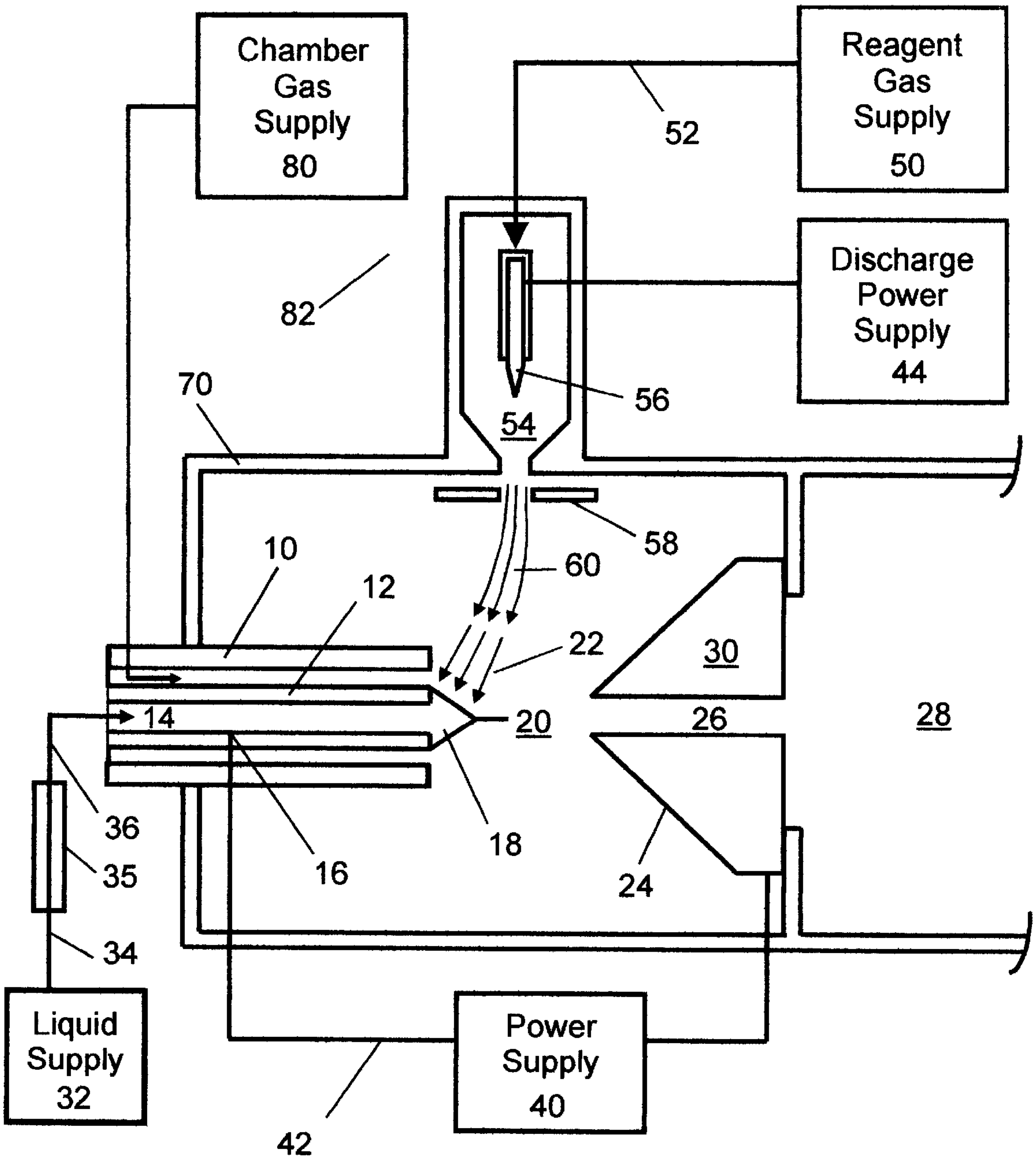
Figure 6:
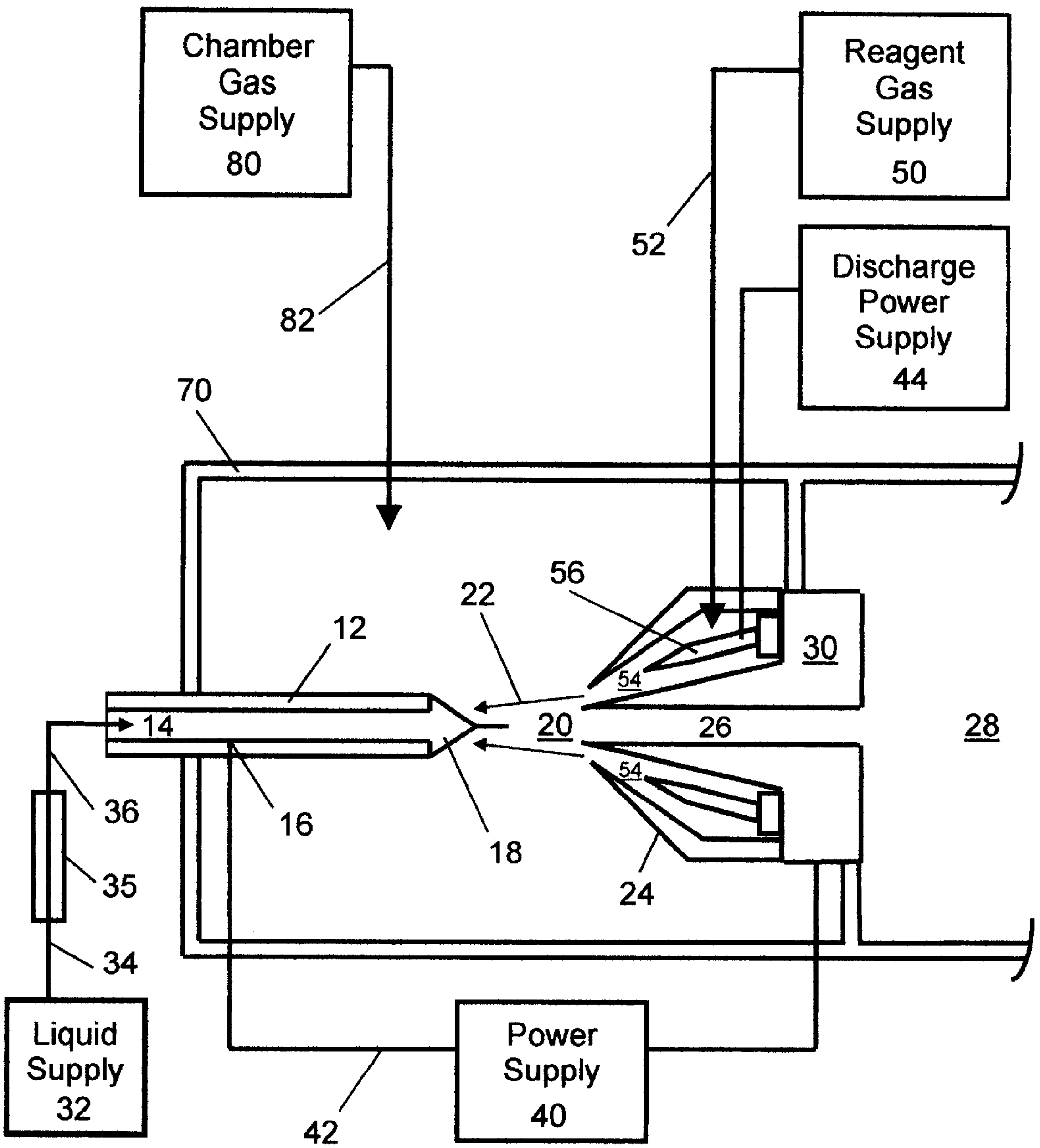

FIG. Three- A current-voltage plot for methanol sprayed through an aluminum coated fused silica needle. The needle was 251 micrometers outer diameter and 50 micrometers inner diameter. Note the rapid increase in current above the onset voltage [$V_{onset}$] below which insufficient energy is supplied to the needle to induce a cone-jet. Note, the rapid increase in current above the breakdown voltage [$V_{breakdown}$] of the gases surrounding the needle above which most of the current flowing from the needle to the collection electrode is conducted through the ionized gases and not on the surface of the droplets.

FIG. Four- A schematic diagram of a preferred embodiment of a counterion impingement apparatus for improved electrospray generation utilizing discharge counterion production.

FIG. Five- A schematic diagram of a preferred embodiment of a counterion impingement apparatus for improved electrospray generation utilizing concentric introduction of reagent gas with external discharge generation of a primary ion or electron flux.

FIG. Six- A schematic diagram of a preferred embodiment of a counterion impingement apparatus for improved electrospray generation utilizing a radial discharge source on-axis with the electrospray cone-jet.

What is claimed is:

1. An electrospray device comprising:

a. a capillary means for introducing liquid sample;

b. a chamber for receiving said liquid sample, which chamber includes at least a first wall in which said capillary means is situated and at least a second wall;

c. a voltage supply means for maintaining a high electrical potential difference between said liquid sample within the capillary means and said second wall, whereby the surface of said liquid sample is distorted at outlet of said capillary means into one or more electrospray cone-jets;

d. a counter-ion generation means for creating gas-phase counter-ions of opposite relative polarity to the said liquid sample potential;

e. a control means for regulating the supply of said counter-ions.

f. a steering means for directing the said gas-phase counter-ions into the surface of the said electrospray cone-jet at the outlet of the said capillary.

g. means for evaporating the said liquid sample to produce gas phase ions from said sample which are introduced into a mass spectrometer or other gas phase ion analyzer.

2. The device of claim 1, further including a second capillary means outside and coaxial with the said first capillary means whereby a ionizable reagent gas is introduced into the first chamber through the interstitial space between said capillary and said second capillary means.

3. The device of claim 2, further including a said ionizable reagent gas comprising, but not limited to $CO_2$, $O_2$, $SF_6$, or volatile halo-carbons.

4. The device of claim 2, further including a said second capillary means electrically isolated from said capillary.

5. The device of claim 4, further including a high voltage supply means to facilitate and maintain an electrical discharge in the intersticial space between said second capillary and the liquid sample at the outlet of the said capillary and in the presence of an ionizable reagent gas that is capable of producing gas-phase counter-ions.

6. The device of claim 1, further including the said counter-ion generation means comprising high voltage electrical discharge ionization source downstream from the outlet of the said capillary.

7. The device of claim 1, further including the said counter-ion generation means comprising a filament ionization source downstream from the outlet of the said capillary.

8. A LC/MS interfacing device comprising:

a. a capillary means for introducing liquid effluent;

b. a chamber for receiving said liquid effluent, which chamber includes at least a first wall in which said capillary means is situated and at least a second wall;

c. a voltage supply means for maintaining a high electrical potential difference between said liquid effluent within the capillary means and said second wall, whereby the surface of said liquid effluent is distorted at outlet of said capillary means into one or more electrospray cone-jets;

d. a counter-ion generation means for creating gas-phase counter-ions of opposite relative polarity to the said liquid effluent potential;

e. a control means for regulating the supply of said counter-ions.

f. a steering means for directing the said gas-phase counter-ions into the surface of the said electrospray cone-jet.

g. means for evaporating the said liquid effluent to produce gas phase ions from the said liquid effluent which are introduced into a mass spectrometer or other gas phase ion analyzer.

9. The device of claim 8, further including a second capillary means outside and coaxial with the said capillary means whereby a ionizable reagent gas is introduced into the first chamber through the interstitial space between said capillary and said second capillary means.

10. The device of claim 9, further including a said ionizable reagent gas comprising, but not limited to $CO_2$, $O_2$, $SF_6$, or volatile halo-carbons.

11. The device of claim 9, further including a said second capillary means electrically isolated from said capillary.

12. The device of claim 11, further including a high voltage supply means to facilitate and maintain an electrical discharge in the intersticial space between said second capillary and the liquid effluent at the outlet of the said capillary and in the presence of an ionizable reagent gas that is capable of producing gas-phase counter-ions.

13. The device of claim 8, further including the said counter-ion generation means comprising high voltage electrical discharge ionization source downstream from the outlet of said capillary.

14. The device of claim 8, further including the said counter-ion generation means comprising a filament ionization source downstream from the outlet of said capillary.

15. A method of creating highly charged droplets, the method comprising the steps of:

a. introducing a liquid sample through a capillary means;

b. receiving the sample into a first chamber which includes at least one wall in which the means for introducing the liquid sample is situated and at least a second wall, c. maintaining a high electrical potential difference between said liquid sample within the capillary means and said second wall, whereby the surface of the said liquid sample is distorted at outlet of said capillary means into one or more electrospray cone-jets;

d. generating a population of gas-phase counter-ions with a counter-ion generation means downstream from the outlet of the said capillary;

e. steering the said gas-phase counter-ions into the said surface of the said liquid sample at the outlet of the said capillary means.

f. a method for evaporating the said highly charged droplets to produce gas phase ions from said sample which are introduced into a mass spectrometer or other gas phase ion analyzer.

16. A method of claim 15 wherein the said liquid sample is the effluent from a liquid chromatographic or electrophoretic system.

17. A method of claim 15 wherein the said highly charged droplets are used as a standard for calibrating particle measurement devices.

18. A method of claim 15 wherein the said chamber is held at pressures below 1 Torr.

* * * * *